Oct. 21, 1924.
F. ATKINSON ET AL
1,512,662
PNEUMATIC TUBE DUST CAP
Filed Jan. 6, 1922
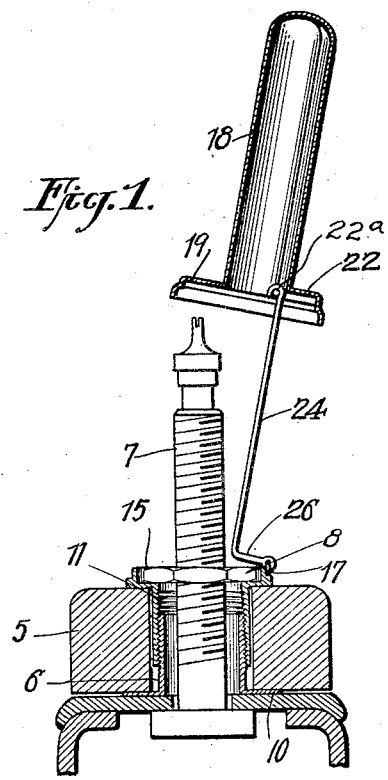
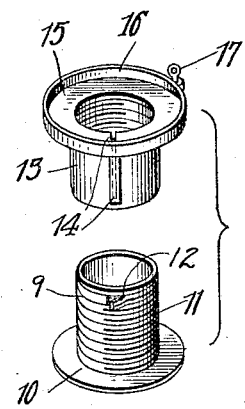
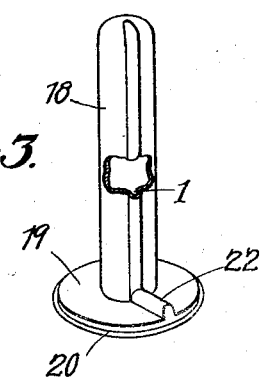
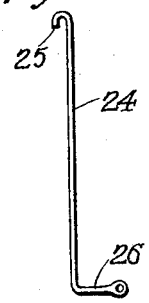
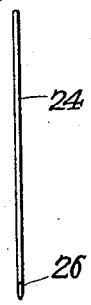
INVENTOR.
FRED ATKINSON.
BY JACK ROSS.
Richard B Owen
ATTORNEY.

Patented Oct. 21, 1924.

1,512,662

UNITED STATES PATENT OFFICE.

FRED ATKINSON AND JACK ROSS, OF NEW YORK, N. Y.

PNEUMATIC-TUBE DUST CAP.

Application filed January 6, 1922. Serial No. 527,469.

*To all whom it may concern:*

Be it known that we, FRED ATKINSON and JACK ROSS, citizens of the United States, residing at New York, in the county of Kings and State of New York, have invented certain new and useful Improvements in Pneumatic Tube Dust Caps, of which the following is a specification.

This invention relates to dust caps and protective devices for automobile tire valves or the like and more particularly to a novel and improved device or mechanism adapted to be attached and secured to the felly of a wheel and locked, yet permitting access to the valve when it is desired to inflate a tire.

The primary object of our invention is the provision of a pair of threaded interlocking members adapted to be positioned through the felly of a wheel and locked so as to securely enclose the stem of a valve including provision for easily gaining access to the valve cap when it is desired to inflate the tire.

A continued object of our invention is the provision of a dust cap capable of being installed on practically any type of motor vehicle wheel valve including provision whereby the threaded sections of the cap are disposed within a recess formed through the felly and locked to prevent the separation of the sections yet permit ready access to the valve stem and the removable threaded cap thereon without removing the dust cap from the felly when the same is once positioned.

An equally important object of our invention is the construction of a dust cap of the character above specified which is extremely simple in construction, highly efficient in operation and use, practical, durable, easily assembled, and removable, of universal application and otherwise capable of being manufactured of various grades of material at a substantially low cost whereby its commercial possibilities are greatly enhanced.

We attain the above objects and others by the structure shown in the accompanying drawings, wherein, Figure 1 is a fragmentary transverse section through the felly and rim of a wheel showing the invention incorporated therewith and illustrating the outer section of the dust cap in its raised inoperative position for permitting the inflation of the valve.

Figure 2 is a perspective view of the companion interlocking members of the inner section of the device.

Figure 3 is a perspective view of the outer section of the dust cap, a part thereof being broken away.

Figure 4 is a side elevation of the lock rod used in connection with the dust cap, and Figure 5 is an edge elevation of the same.

Referring now to the drawings wherein like reference characters designate corresponding parts throughout the several views, 5 designates the wheel felly provided with a cylindrical slot 6 therethrough and receives the conventional type of tire valve 7 having the polygonal nut 8 thereon preventing the valve from falling through the aperture to the inner tube of the tire.

In order to protect the valve 7 from dust and dirt in addition to the water and other foreign matter, we have provided a novel and improved protective device in the nature of a dust cap and consisting of an externally threaded sleeve 9 having a felly engaging flange 10 and on its threaded portion 11 of the sleeve, we have provided a locking projection 12 for a purpose presently to appear. The threaded sleeve 11 is adapted to be connected to the internally threaded sleeve 13 or female member, the latter having a slot 14 in the side thereof which permits of the entry of the projection 12 as the sleeve 11 is threaded thereinto, the said projection 12 being formed so as to prevent the reverse turning and separation of the respective sleeves 11, 13, thus locking the same together. The flanged portion 15 of the upper sleeve is provided with a rim 16 thereon of substantial width and is further provided with an eye 17 to receive the lower bent end of a lock rod subsequently to be referred to.

The dust cap or valve housing 18 is provided with an enlarged base 19 preferably formed integral therewith, having a vertical flange 20 which is adapted to snap over the rim 16 so as to properly engage therewith and connect the housing to the sleeve 13 above referred to. Formed in the side of the housing 18, we have provided an outwardly struck or bent groove 21 which communicates with the groove 22 bent upwardly from the material of the base 19 and extending outwardly to the periphery thereof as clearly shown by Figure 8 of the drawing.

In the grooves 21, 22 we have positioned the lock rod 24 having a hooked upper end 25 which engages a pin 22$^a$ and prevents the removal of the housing 18 when the same is raised to its extreme removed position as shown by Figure 1, the right angularly extending portion 26 of the rod being hingedly connected to the eye 17 on the rim 16 of the female member 13 heretofore described. By positioning the lock rod 24 in this manner it will be readily recognized that the housing 18 may be slid vertically on the rod when it is desired to remove the same so as to gain access to the valve when it is desired to inflate the tire. The sleeves are held in locking engagement and permanently positioned when once placed in the felly of the wheel and consequently the housing 18 of itself could not be utilized as a dust cap and thus it will be seen that the valve protective device as a unit, is perfectly secure and non-removable by unauthorized persons.

Of course the main idea involved in the above construction is the positioning of a pair of sleeves within the felly of a wheel in locked engagement including provision on the top or female sleeve for entirely enclosing the upper stem of a valve.

While we have shown and described our invention with some degree of particularity, it will be readily recognized that various changes in the form, material of construction and assemblage may be resorted to without departing from the spirit and scope of the invention and we do not desire, therefore, to be unnecessarily limited or restricted in the exact details of construction shown except as such limitations or restrictions are specified in the subject matter being claimed.

Having thus described our invention, what we claim as new, and desire to secure by United States Letters Patent is:—

1. A dust cap of the class described comprising a sleeve and an inflation valve housing attached thereto adapted to be positioned on the felly of a wheel and a locking element cooperating with the sleeve for preventing the separation thereof.

2. A dust cap of the class described comprising a sleeve; a housing connected to the sleeve for confining an inflation valve stem and an interfitting locking element cooperating with the sleeve preventing the separation thereof when positioned on a wheel felly.

3. A dust cap of the class described comprising a sleeve, a valve stem housing attachable to the sleeve, means connecting the sleeve to the housing and a locking sleeve cooperating with the first mentioned sleeve.

4. A dust cap of the class described comprising a sleeve, a valve stem housing frictionally attachable to the top of the sleeve, means connecting the sleeve to the housing when the latter is removed whereby access may be had to the stem, and a threaded locking sleeve cooperating with the first mentioned sleeve for preventing the separation thereof.

5. A dust cap of the class described comprising a sleeve; a valve stem housing attachable to the top of the sleeve, said housing having a groove in one side and in the base thereof, a lock rod connected to the sleeve and adapted to lie within the groove, and an externally threaded locking sleeve cooperating with the first mentioned sleeve for preventing the separation thereof when positioned on a wheel felly.

FRED ATKINSON.
JACK ROSS.